United States Patent Office 3,439,049
Patented Apr. 15, 1969

3,439,049
ORGANOLITHIUM POLYMERIZATION
INITIATOR
William J. Trepka, Bartlesville, Okla., assignor to Phillips Petroleum Company, a corporation of Delaware
No Drawing. Filed May 11, 1964, Ser. No. 366,588
Int. Cl. C07c *39/06;* C07f *1/02*
U.S. Cl. 260—624       2 Claims This invention relates to a novel organolithium polymerization initiator. In another aspect it relates to a method of preparing an organolithium polymerization initiator from a halophenol in a hydrocarbon medium.

In the copending application of Uraneck, Buck, Trepka and Sonnenfeld, Ser. No. 315,709, filed Oct. 11, 1963, there are disclosed a number of sparingly soluble lithium-containing polymerization initiators which are very useful for the polymerization of conjugated dienes and other vinylidene-containing monomers in a hydrocarbon diluent. Among the several types of polymerization initiators disclosed, particularly good results can be obtained with those that are derived from halogenated phenols and thiophenols. These initiators can be produced, for example, by reacting the halogenated phenol or thiophenol with an alkyllithium compound. While the initiator derived from the halogenated thiophenol can be formed in either a hydrocarbon or ether medium, a polar solvent has been required in order to prepare the initiator from an alkyllithium compound and a halogenated phenol. For many types of polymerization this does not represent a disadvantage since the product prepared in the polar solvent, such as an ether, serves very satisfactorily and produces polymer in high yield. In some polymerizations, however, such as in the polymerization of isoprene to form cis-polyisoprene, the presence of even small amounts of polar material, such as the polar solvent associated with the initiator, substantially reduces the cis content of the final product. In similar situations involving other types of initiators, this problem has been overcome by replacing the ether in which the initiator is prepared with a hydrocarbon diluent prior to injecting the initiator dispersion into the polymerization reactor. Because ethers form addition compounds or complexes with phenolic compounds, for the lithium derivatives of halogenated phenols it has not been practicable to replace the ether medium with a hydrocarbon in this manner.

According to the present invention, a method is provided by which polymerization initiators derived from halogenated phenols can be prepared in a hydrocarbon medium. I have discovered that an active initiator can be formed in a hydrocarbon diluent by reacting an alkyllithium compound with a halophenol provided the halophenol contains hydrocarbon substituents in the two positions ortho to the hydroxy group. By the proper selection of the halophenol, therefore, the problem of initiator preparation in a hydrocarbon medium can be overcome. An initiator is provided which is entirely free of ether and hence is quite valuable for the polymerization of isoprene to polymers having high cis content.

It is an object of my invention to provide a novel polymerization initiator. Another object of my invention is to provide a method of preparing an organolithium polymerization initiator which is useful for the polymerization of conjugated dienes in a hydrocarbon medium. Another object is to provide a method of preparing in a hydrocarbon medium a polymerization initiator which is a derivative of an alkyllithium and a halophenol. Still another object is to provide an ether-free derivative of an alkyllithium and a halophenol which is useful for polymerizing isoprene to form a high cis polymer. Other objects, advantages and features of my invention will be apparent to those skilled in the art from the following discussion.

The initiators of this invention are made by reacting together an alkyllithium compound and a halophenol containing hydrocarbon substituents in both positions ortho to the hydroxy group.

The alkyl group of the alkyllithium compound preferably contains no more than 12 carbon atoms. Examples of such materials which are suitable include ethyllithium, n-butyllithium, n-hexyllithium, n-dodecyllithium, and the like. The lower alkyllithium derivatives of 2 to 6 carbon atoms are preferred.

The halophenol which is used to prepare the initiator can be represented by the formula

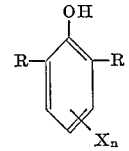

wherein each R group is selected from the group consisting of saturated aliphatic radicals and saturated cycloaliphatic radicals containing from 1 to 6 carbon atoms, X is halogen selected from the group consisting of chlorine, bromine and iodine, and $n$ is an integer that can be 1 or 2. Among the compounds which correspond to the above formula are: 4 - bromo - 2,6 - dimethylphenol, 3-chloro - 2 - methyl - 6 - ethylphenol, 3,5 - dibromo - 2,6-diisopropylphenol, 4 - bromo - 2,6 - di - tert - butylphenol, 4 - iodo - 2,6 - di - n - hexylphenol, 3 - chloro - 2 - ethyl-6 - n - amylphenol, 3 - iodo - 2,6 - diisopropylphenol, 4-bromo - 2,6 - cyclohexylphenol and 3 - chloro - 2,6-cyclopentylphenol, and the like.

The initiators are prepared by reacting the halophenol with the alkyllithium in a hydrocarbon diluent. The reaction can be carried out at room temperature but elevated temperatures are preferred, generally in the range of about 100 to 200° F. The reaction mixture should be well agitated. The amount of alkyllithium should be at least stoichiometric and preferably is used in excess. Normally from 2 to 10 moles, and preferably from 3 to 5 moles, of alkyllithium are employed per mole of halophenol.

Suitable hydrocarbon diluents include benzene, toluene, cyclohexane, methylcyclohexane, xylene, n-butane, n-hexane, n-heptane, isooctane, n-dodecane, and similar paraffins, cycloparaffins and aromatics, ordinarily containing about 4 to 10 carbon atoms per molecule. The time required for the preparation of the initiator can vary from a few minutes to several hours, depending upon the conditions and the reactants. As the initiator is formed, being only sparingly soluble in the diluent, it precipitates and can be separated from the reaction medium by any suitable means, such as centrifugation or filtration. This removes unreacted materials and side products and the solid initiator can be washed further and then redispersed in a hydrocarbon.

The initiators which are thus provided can be used to polymerize any of the monomers described in the above-mentioned copending application Ser. No. 315,709 and are particularly valuable for polymerizing conjugated dienes having 4 to 12 carbon atoms per molecule and the vinyl-substituted aromatic compounds such as styrene, 1-vinylnaphthalene, 2-vinylnaphthalene, and the like. Examples of the conjugated dienes include 1,3-butadiene, isoprene, piperylene, 2-phenyl-1,3-butadiene, and the like.

The present initiator is especially valuable for polymerizing isoprene.

The polymerizations are carried out in hydrocarbon liquid diluents at temperatures in the range of about −100 to +150° C., preferably between −75 and +75° C. The amount of initiator is ordinarily in the range of about 0.05 to 200, preferably 1 to 150 milliequivalents per 100 grams of monomers. The milliequivalents of initiator used in the polymerization is based upon the total lithium atoms present in the initiator composition as determined by titration or by calculation from the molarity, knowing the number of lithium atoms in each molecule of initiator. The hydrocarbon diluents which are used in the polymerization are suitably of the same type that is previously described for preparation of the initiator. The polymerization mixture should be agitated and the reaction time can extend from a few minutes to 100 hours or more. Usually a short induction period is required but the polymerizations are very efficient and conversion is ordinarily quantitative. At the end of the reaction period the initiator can be inactivated and the polymer coagulated by adding an acid or an alcohol. The polymer is then separated, washed and dried using conventional recovery techniques.

The polymerization initiator which is formed according to this invention can be represented by the formula

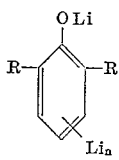

wherein R and $n$ are as previously defined with regard to the halophenol. It can be seen that the initiator is derived by replacing the hydrogen of the hydroxy group and the halogen atoms with lithium atoms. The polymerization is initiated and chain growth occurs at those positions where there is a lithium-carbon bond. The —OLi group remains unchanged and during the recovery steps the lithium atom of this group is replaced by hydrogen so that the recovered polymer contains a hydroxy group at about the center of the molecule or on one end of each polymer chain, depending upon whether $n$ is 2 or 1. The initiator has, therefore, the additional advantage of providing a reactive polymer which can be coupled by reaction with polyfunctional reagents such as polybasic acids, polyisocyanates, and the like. A reactive group can also be placed on the other end of the polymer molecule (or at both ends where $n$ is 2) by replacing the lithium with a functional group, this being done by treating the polymer solution prior to quenching with a reagent such as carbon dioxide, or sulfur. In such a reaction, carbon dioxide introduces a carboxy group; a cyclo disulfide or sulfur introduces mercapto groups; carbon disulfide introduces a carbodithio group; and reaction with aldehydes, ketones or epoxy compounds such as acetaldehyde, acetone, or ethylene oxide introduces another hydroxy group. By placing a hydroxy group on the polymer in this manner, the polymer formed has a hydroxy group on each end of the polymer and can be reacted with polyfunctional reagents previously mentioned to form products of much higher molecular weight. Polymerizations of this type are quenched or inactivated by treating with materials which remove the lithium atoms to replace them with hydrogen, such materials being commonly water, alcohol or acid.

In order to illustrate further the advantages of this invention, the following examples are presented. The conditions, materials, and proportions are typical only and should not be construed to limit my invention unduly.

EXAMPLE I

A polymerization initiator was prepared by reacting n-butyllithium with 4-bromo-2,6-di-tert-butylphenol. The following recipe was employed:

| | | |
|---|---|---|
| 4-bromo-2,6-di-tert-butylphenol [1] | mole | 0.05 |
| n-Butyllithium | do | 0.11 |
| Toluene, 200 ml. | do | 1.9 |
| Time | hours | 24 |
| Temperature | ° F. | 122 |

[1] Prepared by bromination of 2,6-di-tert-butylphenol following a suggested procedure of L. A. Cohen, J. Org. Chem., 22, 1333 (1957).

Toluene was charged first and the reactor was then purged with nitrogen. The 4-bromo-2,6-di-tert-butylphenol was added, the mixture was cooled to ice bath temperature, and the butyllithium was introduced last. The temperature was increased to 122° F. and the reactants were agitated for 24 hours. The mixture was centrifuged to separate the solid reaction product. The supernatant liquid was discarded, the precipitate was washed once with toluene and then with pentane to remove unreacted butyllithium. The washings were discarded and the solid product was dispersed in n-pentane. Total volume of the final dispersion was 320 milliliters. It had a normality of 0.31, determined by withdrawing an aliquot and titrating it with 0.1 N HCl. Total alkalinity of the dispersion expressed as equivalents of lithium was 0.0992 (total mole of initiator=0.0496).

The reaction product of butyllithium with 4-bromo-2,6-di-tert-butylphenol was employed as the initiator for the polymerization of isoprene. A series of runs was made using variable amounts of initiator. The recipe was as follows:

| | | |
|---|---|---|
| Isoprene | parts by weight | 100 |
| n-Pentane | do | 1000 |
| Initiator | milliequivalents | Variable |
| Time | hours | 24 |
| Temperature | ° F. | 122 |

The solvent was charged first after which the reactor was purged with nitrogen. Isoprene was added and then the initiator. The reactants were agitated throughout the polymerization period. At the close of the polymerizations the reactions were terminated by the addition of an isopropyl alcohol solution of 2,2′-methylenebis(4-methyl-6-tert-butylphenol), the amount used being sufficient to provide one part by weight of the antioxidant per 100 parts of rubber. The polymers were coagulated with isopropyl alcohol, separated, and dried. Microstructure, inherent viscosity, and gel were determined on each of the products. The results are summarized in the following table:

| Run No. | Initiator, meq./hm.[1] | Conv., percent | Microstructure, percent | | Inh. visc. | Gel percent |
|---|---|---|---|---|---|---|
| | | | Cis | 3,4-add'n. | | |
| 1 | 14.0 | 100 | 76.6 | 9.4 | 5.93 | 0 |
| 2 | 12.0 | 100 | 72.0 | 9.6 | 6.89 | 0 |
| 3 | 11.2 | 100 | 72.0 | 9.9 | 7.60 | 0 |
| 4 | 10.8 | 100 | 68.9 | 9.9 | 7.97 | 0 |
| 5 | 10.4 | 100 | 70.4 | 9.8 | 8.36 | 0 |

[1] Milliequivalents per 100 grams monomer.

These data show that active initiators can be prepared in hydrocarbon medium when using the hydrocarbon-substituted phenols of this invention.

Attempts were made to prepare initiators by reacting n-butyllithium with 3-bromophenol, 4-bromophenol, 2,4-dibromophenol, and 3-chlorophenol in toluene medium. The procedure was the same as used for the reaction of butyllithium with 4-bromo-2,6-di-tert-butylphenol. A precipitate was obtained in each case. It was separated, washed, and dispersed in n-pentane. Each product was tried as an initiator for the polymerization of isoprene. No polymer was obtained in any of the runs.

EXAMPLE II

Cis-polyisoprene was prepared as described in the preceding example with an initiator level of 10.8 milliequivalents. The polymer had a cis content of 76.6 percent with 9.3 percent 3,4-addition, an inherent viscosity of 7.0 and a Mooney value (ML-4 at 212° F.) of 57.5. The polymer contained no gel. This polyisoprene was evaluated in a treadstock recipe as follows:

| | |
|---|---:|
| Cis-polyisoprene | 100 |
| High abrasion furnace black | 50 |
| Zinc oxide | 3 |
| Stearic acid | 3 |
| Flexamine [1] | 1 |
| Flexzone 3C [2] | 2 |
| Philrich 5 [3] | 5 |
| Pepton 22 [4] | 1 |
| Sulfur | 2.25 |
| NOBS special [5] | 0.5 |

[1] Physical mixture containing 65 percent of a complex diarylamide-ketone reaction product and 35 percent of N,N'-diphenyl-p-phenylenediamine.
[2] N-isopropyl-N'-phenyl-p-phenylenediamine.
[3] Highly aromatic oil.
[4] Di-o-benzamidophenyl disulfide.
[5] N-oxydiethylene-2-benzothiazyl sulfenamide.

Raw properties:

| | |
|---|---:|
| ML-4 at 212° F.[1] | 57.5 |
| Cis _____percent__ | 76.6 |
| 3,4-addition _____do____ | 9.3 |
| I.V. | 7.0 |
| Gel _____percent__ | 0 |

[1] ASTM D-1646-61.

The compounded stock was milled 6 minutes at 290° F. followed by remilling at 330° F. for 5 minutes. The milled stock has the following extrusion properties at 195° F.:

Extrusion rate [1]:

| | |
|---|---:|
| Inches/minute | 47.5 |
| Grams/minute | 87.0 |
| Rating (Garvey die) | 11+ |

[1] Ind. Eng. Chem. 34, 1309 (1942). A No. ½ Royle extruder is used with a Garvey die. The rating is based on 12 for a perfectly formed extruded product, with the lower numbers indicating less nearly perfect products.

The stocks were cured for 30 minutes at 293° F. The physical properties are shown in the following table:

Table

| | |
|---|---:|
| $\nu \times 10^4$ moles/cc.[1] | 1.42 |
| 300% modulus, p.s.i.[2] | 1210 |
| Tensile, p.s.i.[2] | 2880 |
| Elongation, percent[2] | 570 |
| Max. tensile at 200° F., p.s.i.[2] | 1730 |
| $\Delta$T, F [3] | 42.7 |
| Resilience, percent [4] | 72.1 |
| Shore A hardness [5] | 54.0 |
| Oven aged 24 hours at 212° F.: | |
| 300% modulus, p.s.i. | 1580 |
| Tensile, p.s.i. | 2000 |
| Elongation, percent | 375 |
| $\Delta$T, F | 42.4 |
| Resilience, percent | 75.3 |
| Shore A hardness | 57.5 |

[1] Rubber World, 135, 67–73, 254–260 (1956).
[2] ASTM D-412-61T.
[3] ASTM D-623-58.
[4] ASTM D-945-59 (modified)—Gerzley oscillograph. Test specimen is a right circular cylinder 0.7 inch in diameter and one-inch high.
[5] ASTM D-676-59T. Shore Durometer, type A.

The above data show that the initiator of this invention provides a valuable method of polymerizing isoprene to form a product which would be useful for the manufacture of tire treads.

Microstructures were determined with a commercial infrared spectrometer. For polyisoprene the samples were dissolved in carbon disulfide so as to form a solution containing 25 grams of polymer per liter of solution. Calibrations were based on deproteinized natural rubber as a reference material assuming that it contained 98 percent cis and 2 percent 3,4-addition product. The cis was measured at the 8.9 micron band and 3,4-addition at the 11.25 micron band. In the presence of a high cis-polyisoprene, trans is not detectable, since trans is measured at the 8.75 micron band. The raw cis and raw 3,4-addition can be converted to normalized values by changing each value proportionally so that their sum equals 100%. For polybutadiene, similar polymer solutions are formed and the percent of the total unsaturation present as trans 1,4- is calculated according to the following equation and consistent units: $\epsilon = E/tc$, where $\epsilon$=extinction coefficient (liters-mols$^{-1}$-centimeters$^{-1}$); $E$=extinction (log $I_0/I$); $t$=path length (centimeters); and $c$=concentration (mols double bond/liter). The extinction is determined at the 10.35 micron band and the extinction coefficient is 146 (liters-mols$^{-1}$-centimeters$^{-1}$). The percent of the total unsaturation present as 1,2- (or vinyl) is calculated according to the above equation, using the 11.0 micron band and an extinction coefficient of 209 (liters-mols$^{-1}$-centimeters$^{-1}$). The percent of the total unsaturation present as cis 1,4- is obtained by subtracting the trans 1,4- and 1,2- (vinyl) determined according to the above procedure from the theoretical unsaturation, assuming one double bond per each $C_4$ unit in the polymer.

One-tenth gram of polymer was placed in a wire cage made from 80 mesh screen and the cage was placed in 100 ml. of toluene contained in a wide-mouth, 4-ounce bottle. After standing at room temperature (approximately 77° F.) for 24 hours, the cage was removed and the solution was filtered through a sulfur absorption tube of grade C porosity to remove any solid particles present. The resulting solution was run through a Medalia-type viscometer supported in a 77° F. bath. The viscometer was previously calibrated with toluene. The relative viscosity is the ratio of the viscosity of the polymer solution to that of toluene. The inherent viscosity is calculated by dividing the natural logarithm of the relative viscosity by the weight of the original sample (soluble portion).

Determination of gel was made along with the inherent viscosity determination. The wire cage was calibrated for toluene retention in order to correct the weight of swelled gel and to determine accurately the weight of dry gel. The empty cage was immersed in toluene and then allowed to drain three minutes in a closed wide-mouth, two-ounce bottle. A piece of folded quarter-inch hardware cloth in the bottom of the bottle supported the cage with minimum contact. The bottle containing the cage was weighed to the nearest 0.02 gram during a minimum three-minute draining period after which the cage was withdrawn and the bottle again weighed to the nearest 0.02 gram. The difference in the two weighings is the weight of the cage plus the toluene retained by it, and by subtracting the weight of the empty cage from this value, the weight of toluene retention is found, i.e., the cage calibration. In the gel determination, after the cage containing the sample had stood for 24 hours in toluene, the cage was withdrawn from the bottle with the aid of forceps and placed in the two-ounce bottle. The same procedure was followed for determining the weight of swelled gel as was used for calibration of the cage. The weight of swelled gel was corrected by subtracting the cage calibration.

As will be apparent to those skilled in the art, various modifications can be made in this invention without departing from the spirit or scope thereof.

I claim:
1. A polymerization initiator which is free of associated ether and has the formula

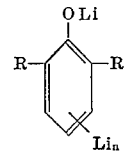

wherein each R is selected from the group consisting of saturated alkyl radicals and saturated cycloalkyl radicals having 1 to 6 carbon atoms and $n$ is an integer of 1 to 2.

2. An initiator composition comprising an ether-free hydrocarbon dispersion of a compound having the formula

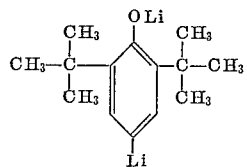

References Cited

Gelman et al., J. Organic Chemistry, vol. 10, pp. 374–377 (1945).

Jones et al., Organic Reaction, vol. 6, pp. 339–352.

BERNARD HEFLIN, *Primary Examiner.*

W. B. LONE, *Assistant Examiner.*

U.S. Cl. X.R.

252—431; 260—621, 623